US012450918B2

(12) United States Patent
Sharma et al.

(10) Patent No.: US 12,450,918 B2
(45) Date of Patent: Oct. 21, 2025

(54) AUTOMATIC LANE MARKING EXTRACTION AND CLASSIFICATION FROM LIDAR SCANS

(71) Applicant: Motional AD LLC, Boston, MA (US)

(72) Inventors: Dhananjai Sharma, Singapore (SG); Venice Erin Baylon Liong, Singapore (SG); Sergi Adipraja Widjaja, Singapore (SG); Edouard Francois Marc Capellier, Singapore (SG)

(73) Assignee: Motional AD LLC, Boston, MA (US)

( * ) Notice: Subject to any disclaimer, the term of this patent is extended or adjusted under 35 U.S.C. 154(b) by 362 days.

(21) Appl. No.: 17/823,916

(22) Filed: Aug. 31, 2022

(65) Prior Publication Data
US 2024/0096109 A1    Mar. 21, 2024

Related U.S. Application Data

(60) Provisional application No. 63/365,698, filed on Jun. 1, 2022.

(51) Int. Cl.
*G06V 20/56* (2022.01)
*G01S 17/89* (2020.01)
*G06T 7/10* (2017.01)
*G06V 10/82* (2022.01)

(52) U.S. Cl.
CPC ............ *G06V 20/588* (2022.01); *G01S 17/89* (2013.01); *G06T 7/10* (2017.01); *G06V 10/82* (2022.01); *G06T 2207/10028* (2013.01)

(58) Field of Classification Search
CPC ...... G06V 20/588; G06V 10/82; G06V 20/56; G06V 10/469; G06V 10/757; G06V 10/764; G06V 10/7715; G06V 10/94; G01S 17/89; G01S 17/894; G06T 7/10;
(Continued)

(56) References Cited

U.S. PATENT DOCUMENTS

| 9,710,714 B2 * | 7/2017 | Chen .................... G06V 10/806 |
| 10,558,222 B2 * | 2/2020 | Fridman .................. H04N 7/18 |
| 12,122,420 B2 * | 10/2024 | Carillo Peña .......... G06N 3/063 |

(Continued)

FOREIGN PATENT DOCUMENTS

CN    112241963 A    1/2021

OTHER PUBLICATIONS

Li, et al, A Deep Learning-Based Hybrid Framework for Object Detection and Recognition in Autonomous Driving, 2020, IEEE (Year: 2020).*

(Continued)

*Primary Examiner* — Emily C Terrell
*Assistant Examiner* — Jordan McKenzie Elliott
(74) *Attorney, Agent, or Firm* — Knobbe, Martens, Olson & Bear, LLP

(57) ABSTRACT

Provided are methods, systems, and computer program products for generating an output map indicating a likelihood of individual elements of an image as corresponding to particular road elements, such as lane dividers, road dividers, and road boundaries. An example method may include applying a machine learning architecture to the image, which architecture includes a convolutional neural network and a sub-network capturing global context from feature maps generated by the convolutional neural network.

13 Claims, 12 Drawing Sheets

(58) Field of Classification Search
CPC ... G06T 2207/10028; G06T 3/06; G06T 7/70; G06T 2207/30256; G06N 3/0464; G06N 20/00
See application file for complete search history.

(56) References Cited

U.S. PATENT DOCUMENTS

| | | | |
|---|---|---|---|
| 2017/0039436 A1 | 2/2017 | Chen et al. | |
| 2019/0156206 A1* | 5/2019 | Graham | G06N 3/08 |
| 2020/0025935 A1* | 1/2020 | Liang | G06V 20/64 |
| 2020/0104690 A1* | 4/2020 | Bai | G06F 9/30098 |
| 2020/0271450 A1* | 8/2020 | Gorur Sheshagiri | G06F 1/163 |
| 2021/0027634 A1 | 1/2021 | Li | |
| 2021/0046861 A1* | 2/2021 | Li | G06V 10/30 |
| 2021/0082181 A1* | 3/2021 | Shi | G06N 3/045 |
| 2021/0150230 A1* | 5/2021 | Smolyanskiy | G06V 10/82 |
| 2022/0073090 A1* | 3/2022 | Kakeshita | G06V 10/56 |
| 2022/0300745 A1* | 9/2022 | Yang | G06V 10/80 |
| 2023/0089897 A1* | 3/2023 | Pan | G06V 20/56 382/159 |
| 2023/0139606 A1* | 5/2023 | Kim | G06T 7/246 701/3 |
| 2024/0378137 A1* | 11/2024 | Frickenstein | G06N 3/044 |
| 2024/0416897 A1* | 12/2024 | Iwabuchi | B60W 30/09 |

OTHER PUBLICATIONS

Lang, PointPillars: Fast Encoders for Object Detection From Point Clouds, 2019 (Year: 2019).*

Lang, A. et al., "PointPillars: Fast Encoders for Object Detection from Point Clouds", CVPR 2019, May 2019, arXiv:1812.05784v2, in 9 pages.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Great Britain Office Action issued for Application No. GB 2218175.4, dated Dec. 15, 2022.

Great Britain Office Action issued for Application No. GB 2218175.4, dated Jun. 1, 2023.

Great Britain Office Action (Preliminary Examination) issued for Application No. GB 2414748.0, dated Oct. 11, 2024.

Great Britain Office Action issued for Application No. GB 2414748.0, dated Nov. 12, 2024.

Great Britain Office Action issued for Application No. GB 2414748.0, dated May 14, 2025.

* cited by examiner

AUTOMATIC LANE MARKING EXTRACTION AND CLASSIFICATION FROM LIDAR SCANS

DETAILED DESCRIPTION

Figure 1:
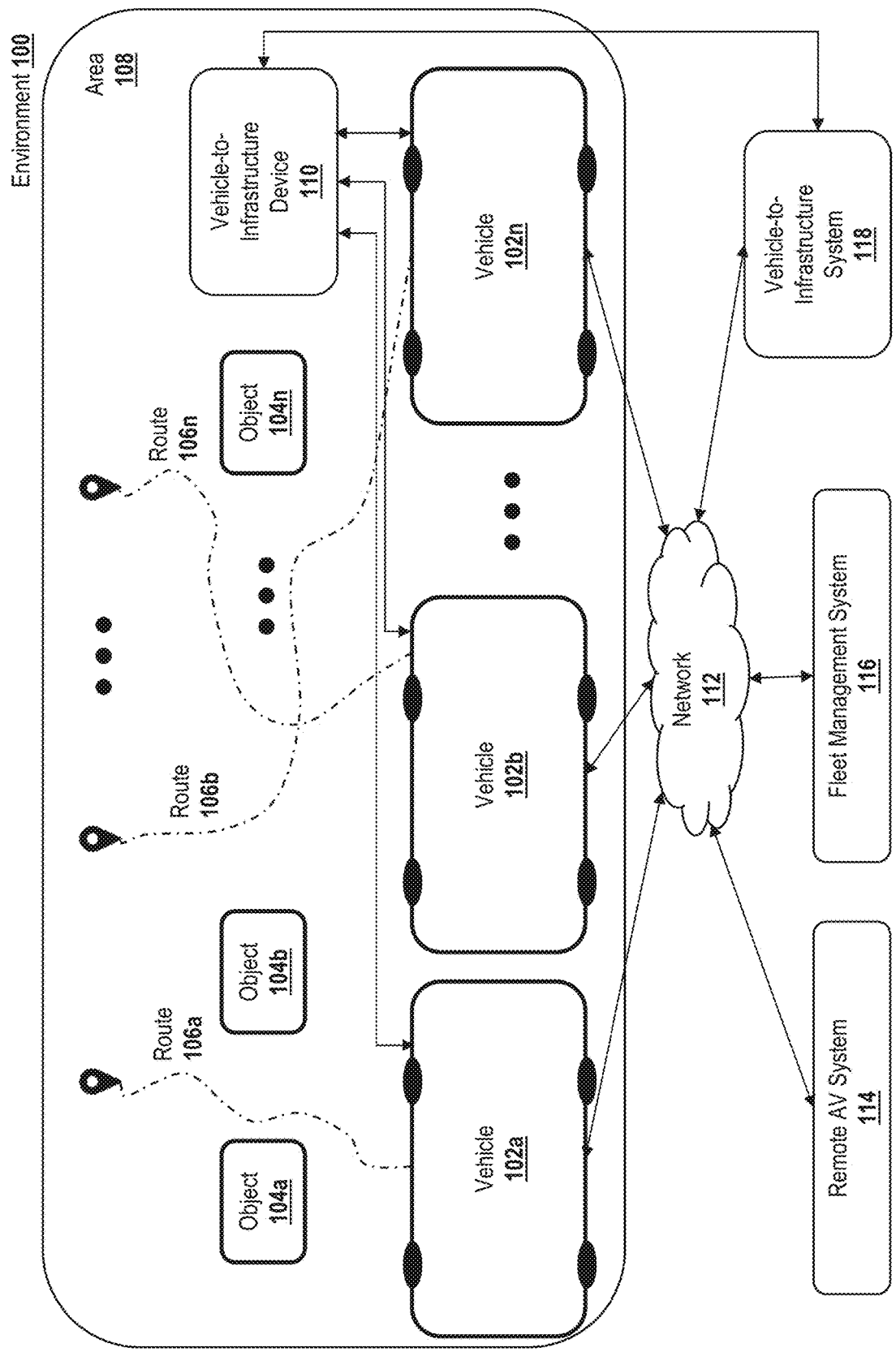
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

Generally described, aspects of the present disclosure relate to generation of highly accurate roadway maps denoting road elements, such as lane dividers, road dividers, road boundaries, and the like, from lidar scans. More specifically, the present disclosure provides a machine learning model that can facilitate generation of annotations to imaging data, such as road feature annotations to a pseudo-image generated from a lidar scan, using both a convolutional neural network (CNN) and a scene feature vector generated based on intermediate representations generated by the CNN. As disclosed herein, the machine learning model provided herein can enable generation of highly accurate annotations based both on individual features within portions of imaging data and contextual information provided by the data as a whole. In one instance, embodiments of the present disclosure may be utilized to generate highly accurate road maps for use in guiding operation of an autonomous vehicle.

As would be appreciated by one skilled in the art, safe and effective operation of an autonomous vehicle (AV) can often rely heavily on accurate knowledge of a surrounding area. One mechanism for providing that knowledge is to provide the AV with a birds-eye-view (BEV) map of the operational area of the AV. For example, the AV may utilize sensor data to generate a map on-the-fly, or may obtain a pre-generated map. Particularly for pre-generated maps, objective accuracy may be of high importance. That is, it may be critical for an AV to have an accurate understanding of its surroundings, and for that understanding to reflect objective truth that is invariant between AVs (e.g., as between an AV that created the map and the AV that is utilizing the map for operation).

While a variety of data capture technologies exist, many are unable to independently provide data of sufficient accuracy for map generation, particularly "offline" map generation, in which a pre-generated map is later provided to an operational vehicle for use as ground truth. For example, 2D imaging technologies such as traditional cameras may provide data that varies significantly based on position, point of view, environmental conditions, camera parameters and the like. Thus, it can be difficult to generate highly accurate maps based solely on 2D imaging. Lidar, in contrast, has emerged as an important technology for providing high accuracy understanding of an environment. In contrast to 2D imaging technologies, lidar additionally provides for depth sensing, enabling 3D imaging of an area. In conjunction with precision location information, such as that provided by a global positioning system (GPS) or other location information, these 3D images can provide for accurate, objective sensing. However, lidar may have some disadvantages relative to traditional 2D imaging such as cameras. For example, lidar may have difficulty distinguishing colors in sensed objects. As a result, it can be difficult to programmatically distinguish color-based markings, such as lane dividers, road dividers, and road boundaries, from lidar data alone. While combining lidar data with other forms of data, such as camera data, might address this concern, combining lidar with data of additional modalities can be a non-trivial task in terms of both engineering and operational complexity. For example, processing such a combination may require significantly more computing resources than processing lidar data alone. Accordingly, it may be beneficial to provide a system that facilitates high accuracy learning of features such as road markings from lidar scans alone.

Embodiments of the present disclosure provide for this high accuracy learning of features, such as road markings, from lidar scans, potentially alone or independent of data from other sensor modalities. Specifically, a machine learning architecture is disclosed herein that includes a CNN to process 2D imagery data, such as a pseudo-image generated from one or more lidar scans of an area, and identify features within that imagery data, such as road markings. The road markings can include, for example, lane dividers that divide same-direction lanes on a roadway, road divider markings that divide different direction lanes on a roadway, road boundaries that mark edges of the roadway, stop lines that indicate where a vehicle is to stop, pedestrian markings that indicate pedestrian walkways (e.g., crosswalks), bike path markings, and chevron markings. More particularly, the machine learning architecture disclosed herein can include a sub-network that generates, from one or more intermediate representations generated by the CNN, a scene feature vector capturing contextual information for an environment as a whole. As disclosed herein, use of such a sub-network can enable more accurate distinguishment between features that appear similar within input data. For example, in the case of lidar data, lane dividers and road dividers may be represented similarly (given that lidar scans typically do not accurately capture color). Accordingly, it may be difficult for existing machine learning models, which often focus particularly on detection of specific local features, to distinguish between lane and road dividers. However, by utilizing a sub-network that provides scene feature vectors as disclosed herein, a model can be trained to more accurately distinguish these markings on the basis of contextual information reflecting an environment as a whole. Thus, the machine learning architecture disclosed herein can represent an improvement to existing techniques for identifying features within imaging data, thus enabling more accurate generation of maps usable in various contexts, such as AVs.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
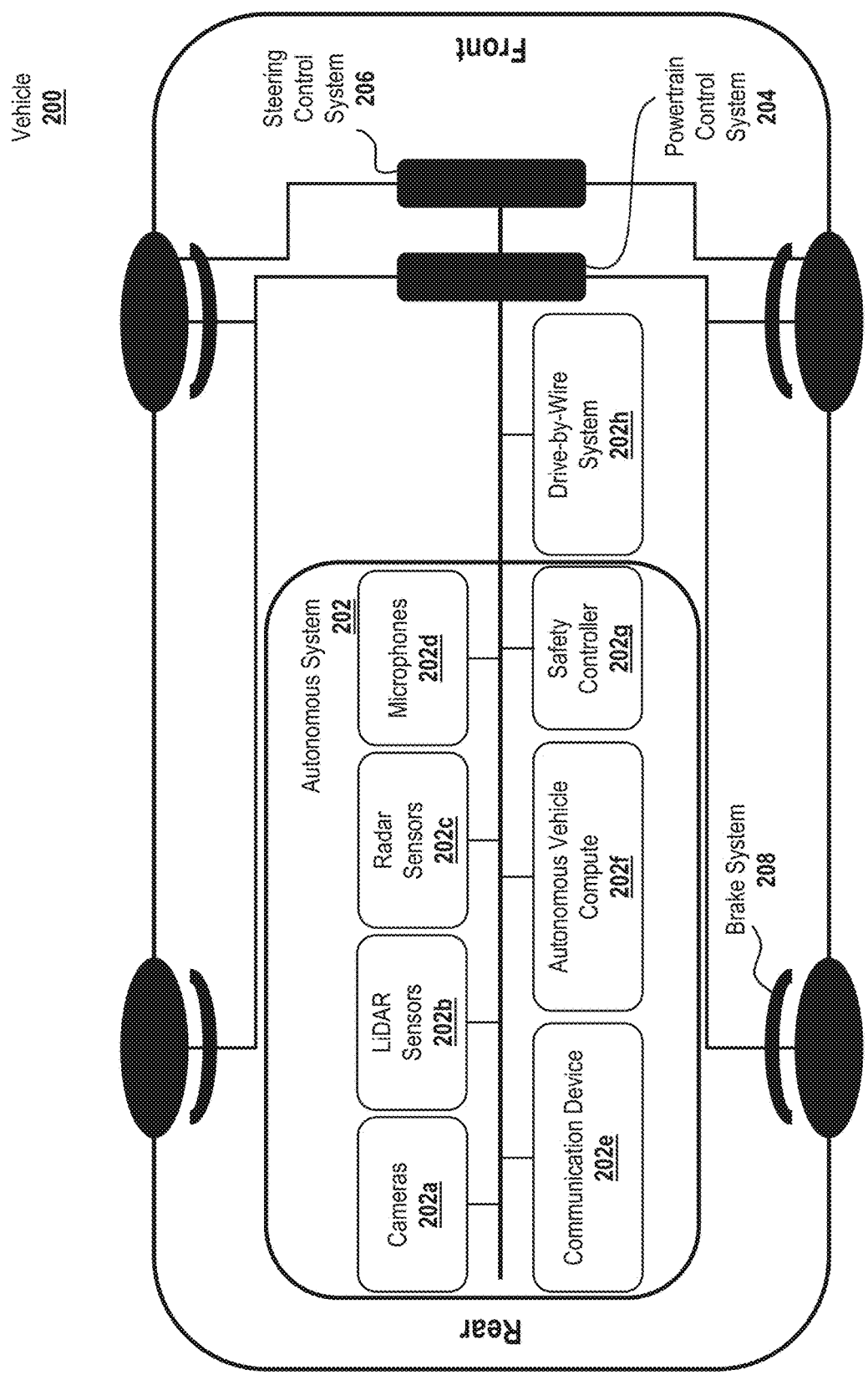
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
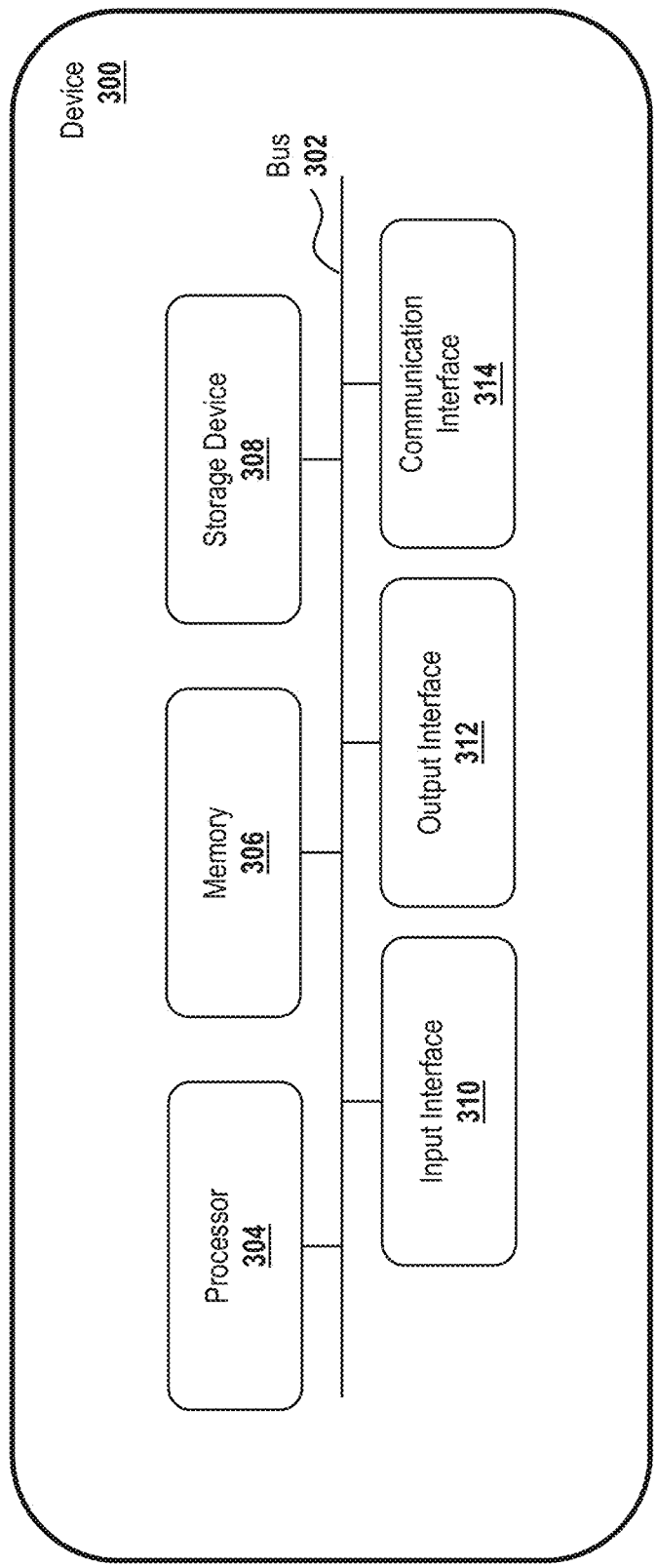
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data (TLD data) associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4A:
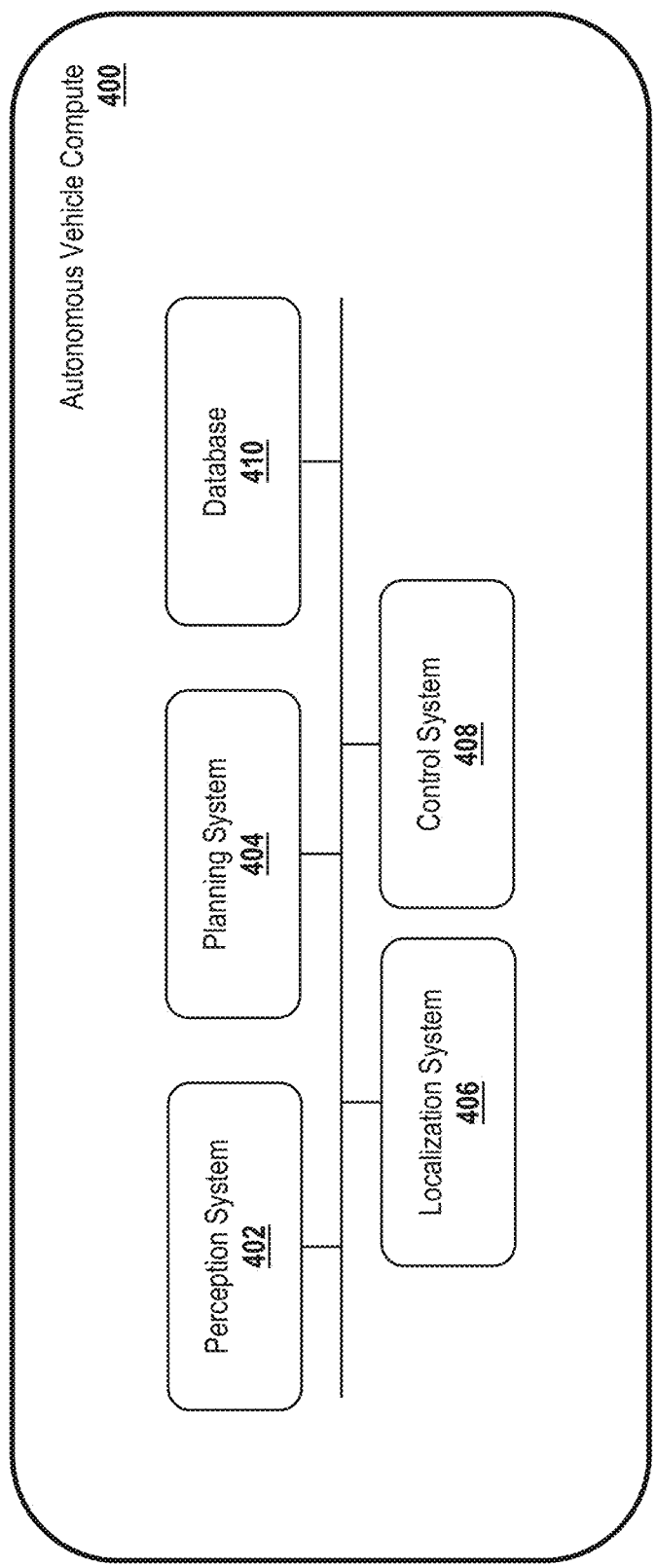
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
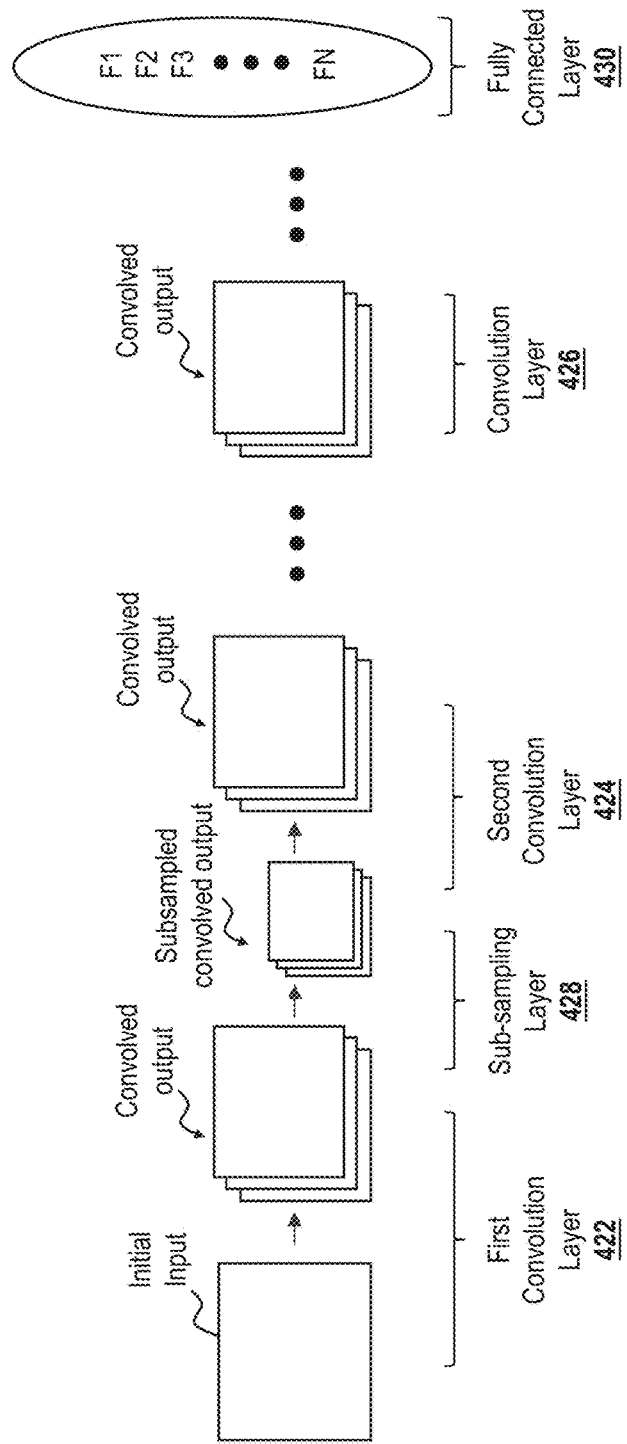
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
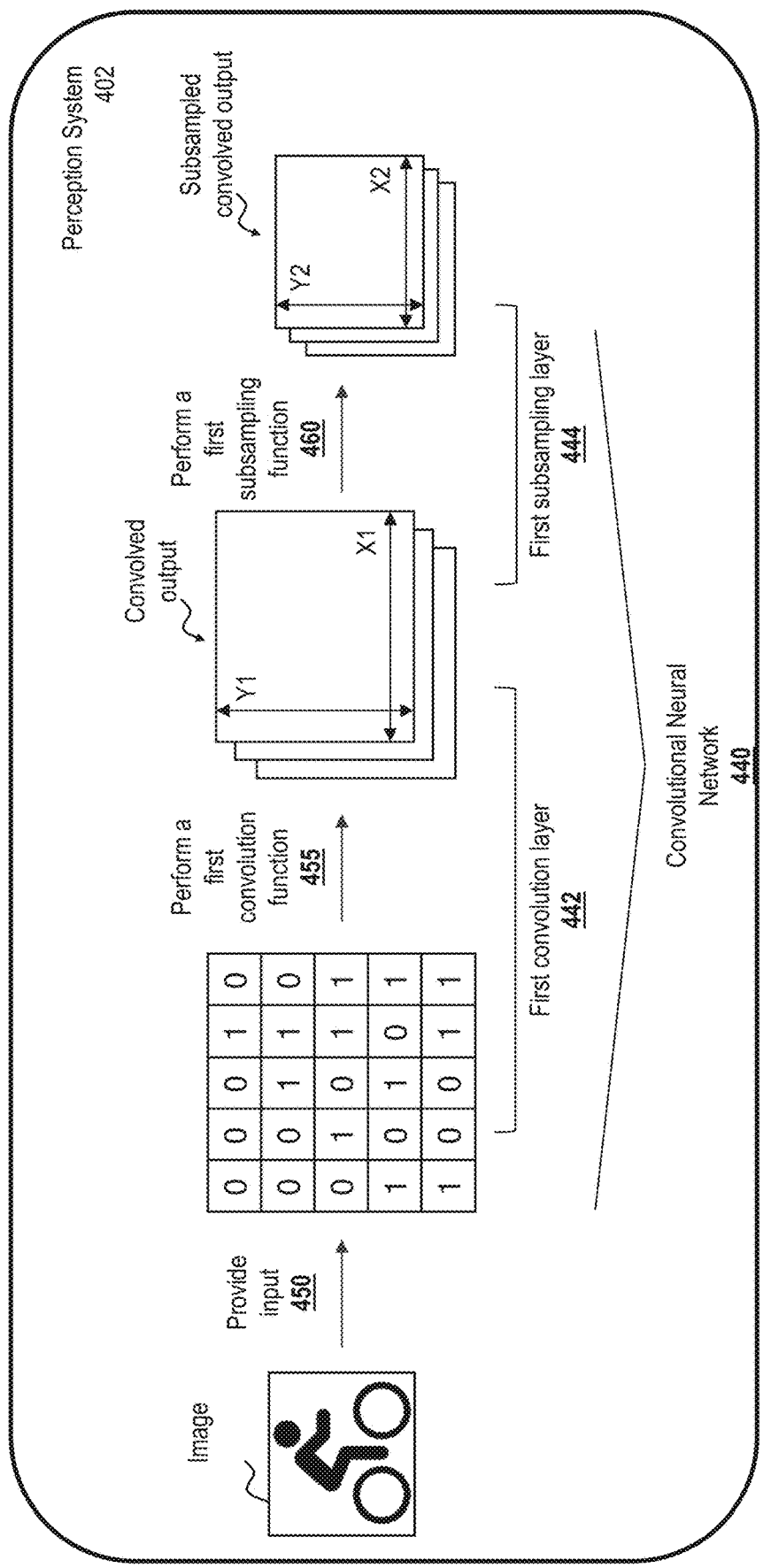
FIGS. 4C and 4D are a diagram illustrating example operation of a CNN.
Figure 4D:
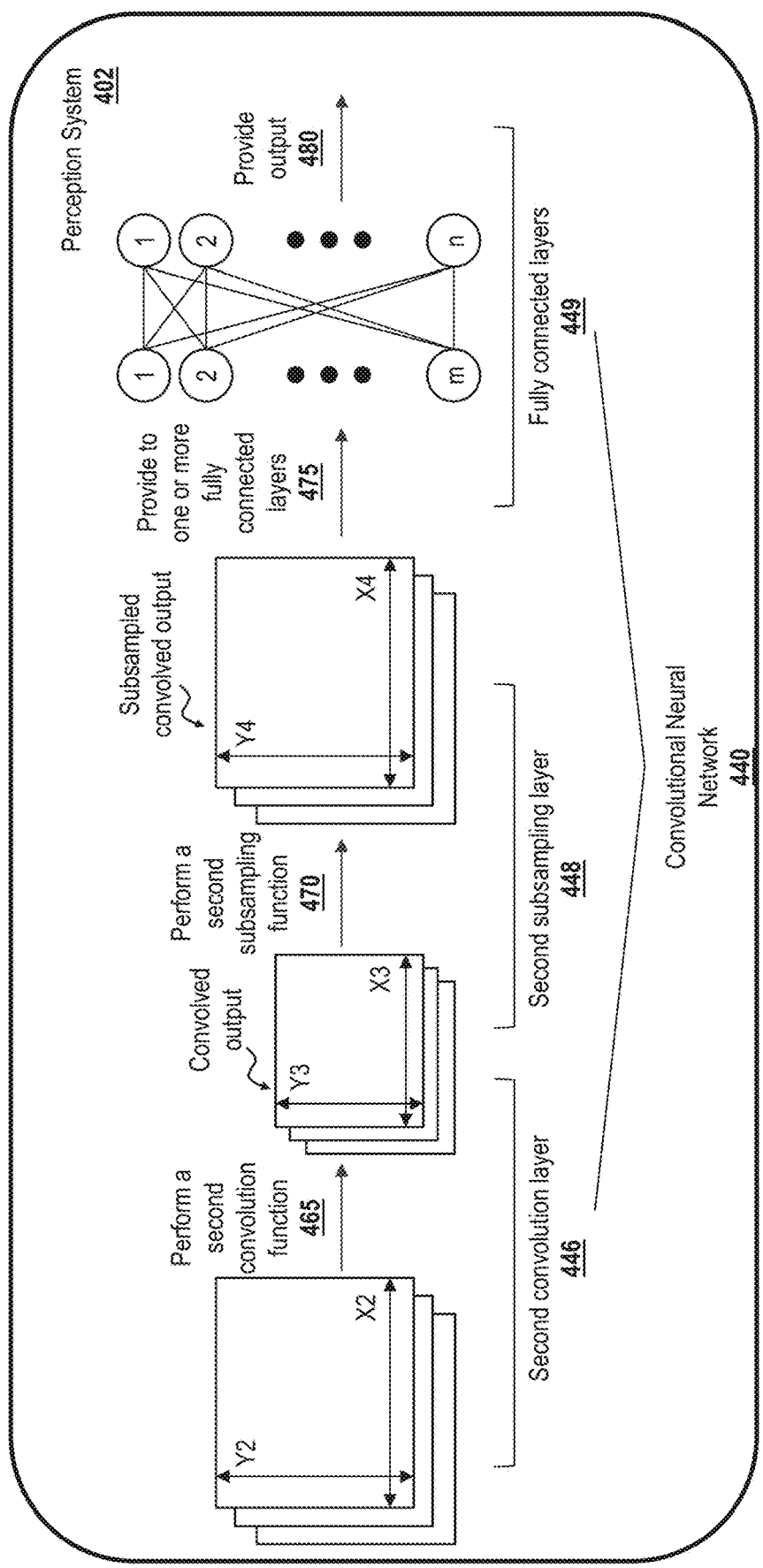

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Lane Classification System

As noted above, autonomous vehicles often rely heavily on maps to accurately reflect their current operating environment. For example, safe and effective operation of an AV may rely strongly on knowledge of a current roadway, such as where boundaries of the roadway are and the configuration of lanes within the roadway. This configuration is often marked by various lane markings, such as lane dividers (dividing same-direction lanes), road dividers (dividing different direction lanes), and road boundaries. While these markings may be visually depicted in camera imagery, it may be difficult to capture the precise locations of these markings using such imagery. Moreover, these marking may be difficult to programmatically detect in more accurate sensor data, such as lidar data.

Embodiments of the present disclosure address these difficulties by providing a lane classification system 504 that can accurately detect lane markings within lidar data or other 3D imaging data, and use such markings to classify lanes of a roadway. In one embodiment, lane markings and/or lane classifications are used to control operation of an AV. In another embodiment, lane markings and/or lane classifications are used to generate highly accurate maps of the roadway, which maps may for example be loaded into other AVs (e.g., lacking lidar sensor modalities) to facilitate operation of those other AVs. In one embodiment, the lane classification system 504 is implemented by a computing system within an AV, such as a device 300 of FIG. 3 included within a vehicle 102 of FIG. 1. In another embodiment, the lane classification system 504 is implemented by a computing system external to an AV, such as a device 300 of FIG. 3 implemented independent of a vehicle 102 of FIG. 1.

Figure 5:
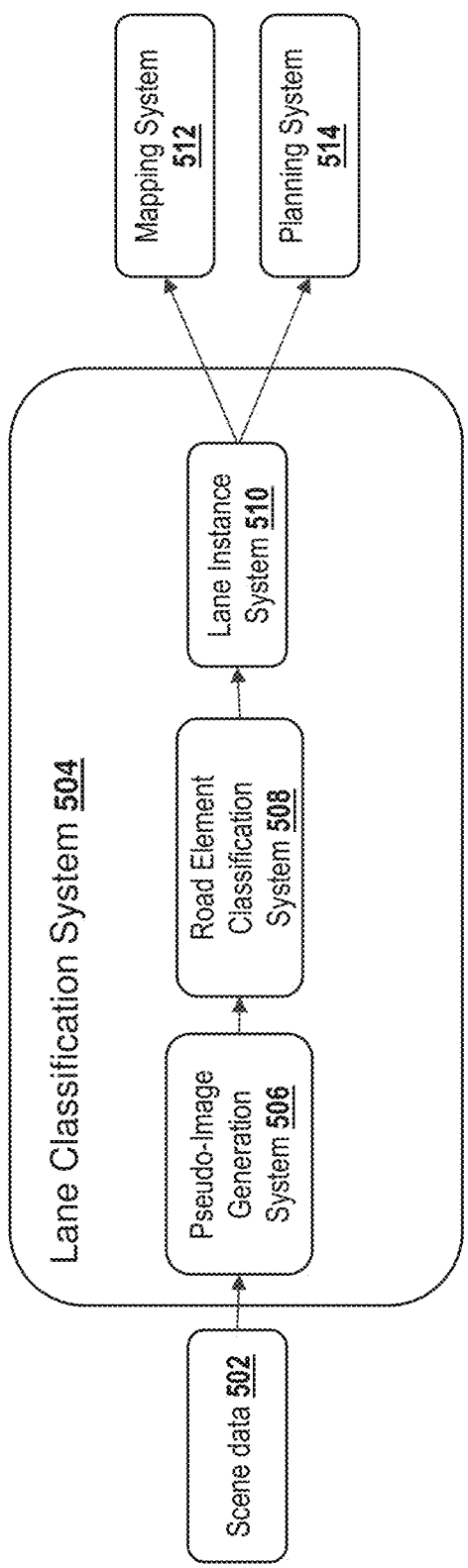
FIG. 5 is a block diagram illustrating operation of a lane classification system to accurately detect road elements from lidar data.

As shown in FIG. 5, the lane classification system 504 illustratively operates on the basis of scene data 502. Scene data 502 illustratively includes data from a particular environment, such as a given roadway. In one embodiment, scene data 502 includes lidar data, which may correspond to a 3D representation of the environment such as a point cloud. In other embodiments, scene data 502 can additionally or alternatively include data from other sensor modalities, such as camera images, radar, or the like. Scene data may include additional data pertaining to (but potentially not captured from) the environment, such as location information provided by GPS or other accurate localization technique. In one example, scene data 502 includes data captured from the environment via a single sensor modality. For example, scene data 502 may include data captured from the environment via a lidar sensor (e.g., in addition to other data pertaining to but not captured from the environment, such as a GPS location).

In some cases, scene data 502 may be "live" data, such as a data stream reflecting a current state of the environment. In other cases, scene data 502 may be previously captured and stored data, and thus might not reflect a current state of the environment. Moreover, scene data 502 may reflect data from a single scan of the environment, or an aggregation of multiple scans. Illustratively, scene data 502 may correspond to an aggregate of multiple lidar scans of an area, potentially captured over time and at different locations in the area. Such aggregated data may in some cases increase the accuracy of the scene data 502.

As shown in FIG. 5, scene data 502 is fed into a pseudo-image generation system 506 configured to generate, from the scene data 502, a pseudo-image. Generally described, a pseudo-image can correspond to a 2D representation of 3D data, such as lidar data. For example, the pseudo-image can "compress" multiple data points along a given dimension of the 3D data, such as a "pillar" of points along a given value for a height dimension (Z axis), into a single data point in resultant 2D data. Data points within the pseudo-image may be augmented with information regarding the multiple points from which it was created, such as a maximum and minimum value for an attribute of multiple points within the compressed dimension represented by the data point in the pseudo-image, a statistical aggregate of attribute values among the multiple points, or the like. Thus, the pseudo-image can enable 3D data, such as lidar data, to be processed via 2D processing techniques. In one embodiment, the pseudo-image is generated according to the techniques discussed in "PointPillars: Fast Encoders for Object Detection from Point Clouds" by Alex H. Lang et al., arXiv:1812.05784, available at https://doi.org/10.48550/ arXiv.1812.05784, the entirety of which is incorporated by reference herein. In some cases, the pseudo-image generation system 506 is implemented using one or more neural networks trained to receive 3D image data and output a pseudo-image. In one instance, the pseudo-image is a BEV image of an area.

In one example, the pseudo-image generation system 506 generates a pseudo-image from scene data 502 representing a single scan of an environment. In another example, the pseudo-image generation system 506 generates a pseudo-image from scene data 502 representing multiple scans of an environment. Illustratively, the pseudo-image generation system 506 may aggregate multiple scans into a single aggregate lidar point cloud, such as by overlaying the data of each scan while adjusting for differences between the scans (e.g., by adjusting for a relative position of the lidar sensor between scans). Additionally or alternatively, the scene data 502 may include such an aggregate point cloud. Furthermore, the lane classification system 504 may in some embodiments be configured to directly accept pseudo-images or other 2D imagery, and as such may omit the pseudo-image generation system 506 or not utilize the pseudo-image generation system 506 with respect to such imagery.

In FIG. 5, the pseudo-image or other 2D imagery is then passed to a road element classification system 508, which illustratively implements a neural network machine learning architecture to identify, within the pseudo-image or other 2D imagery, pixels corresponding to particular road elements, such as lane dividers, road dividers, or road boundaries. As described in more detail below, the road element classification system 508 may implement a CNN in conjunction with a sub-network that generates a scene feature vector for the input data (e.g., the pseudo-image). The scene feature vector may function to capture contextual information regarding the scene data 502 overall, thus facilitating (for example) distinction between road and lane dividers, which may otherwise be difficult to distinguish. In one example, the scene feature vector is used as an input during deconvolution layers of the machine learning architecture, such that an output of the machine learning architecture incorporates features learned from the scene feature vector, enabling more accurate detection of road features. Illustratively, the road element classification system 508 can provide as output an annotated 2D image, with annotations indicating for example whether each pixel of the input 2D image corresponds to a given road element.

Thereafter, the output of the road element classification system 508 is passed to a lane instance system 510. In FIG. 5, the lane instance system 510 is configured to generate from an annotated 2D image a set of polylines representing lanes within an area corresponding to the 2D image. For example, the lane instance system 510 may accept a 2D image in which each pixel is annotated with confidence values corresponding to various potential road elements. As described in more detail below, the lane instance system 510 may apply various transformations to the 2D image, such as thresholding and skeletonization, to identify a set of pixels that are predicted to correspond to a particular road element. The lane instance system 510 can thereafter convert the set of pixels to a polyline—a continuous line of one or more line segments that represents the road element. Thus, a 2D image containing pixels associated with confidence values can be converted into a set of edges and vertices representing a road element.

The polylines generated by the lane instance system 510 can thereafter be used as a highly accurate representation of road features within an area corresponding to the input scene data 502. For example, the polylines may be passed to a mapping system 512 configured to generate a map for the area. Illustratively, the mapping system 512 may be configured to combine the polylines with other information regarding an area in order to generate an area map, which may illustratively be transmitted to one or more AVs for use in navigating an area.

As another example, the polylines may be passed to a planning system 514 to facilitate planning. For example, the planning system 514 may correspond to the planning system 404 of FIG. 4A. Accordingly, the planning system 514 may utilize the polylines to navigate the area represented by scene data 502, such as by planning a route to maintain a current lane, planning lane changes, detecting other traffic, and the like.

Figure 6:
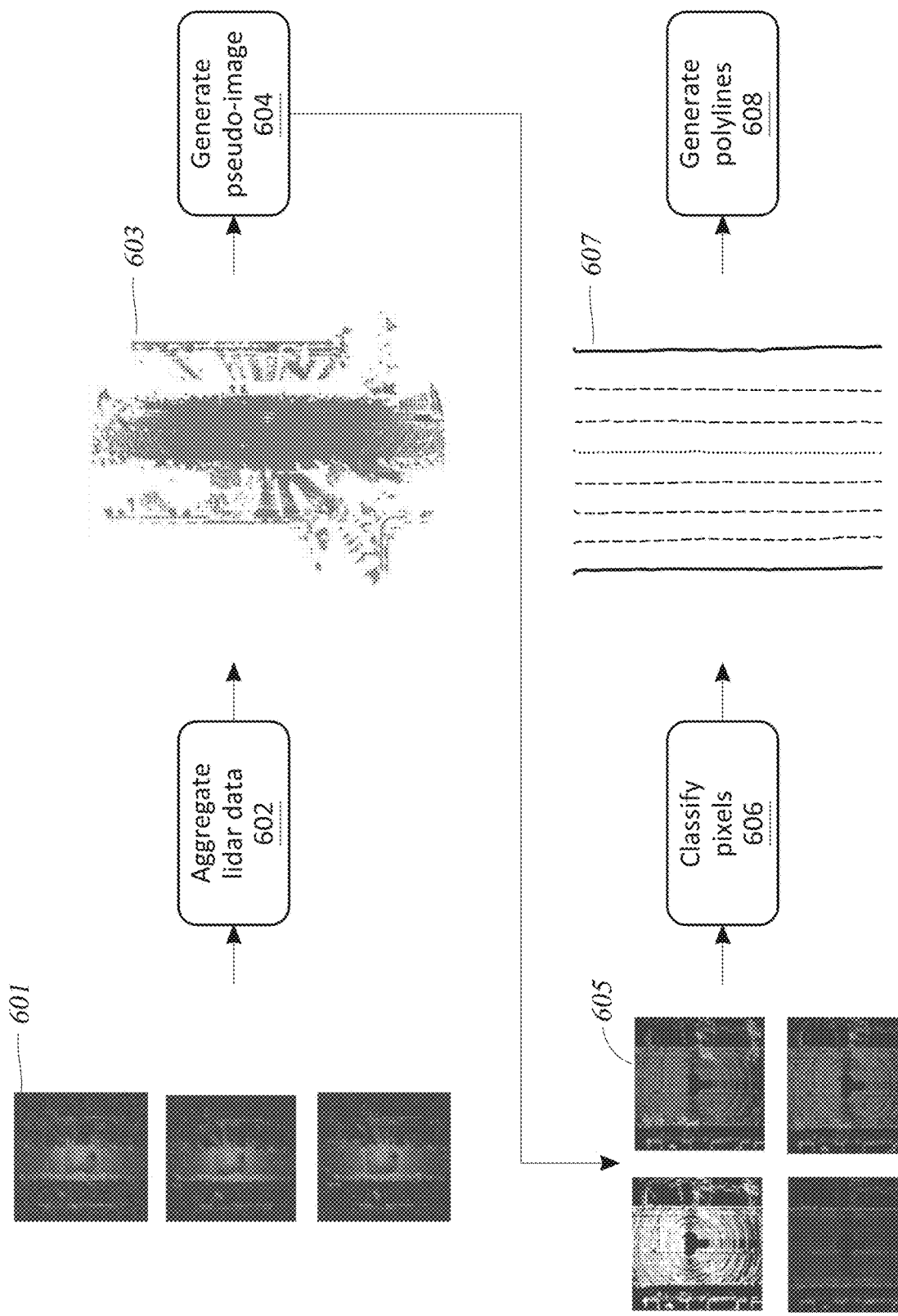
FIG. 6 is a visualization of example images as processed at various points during the operations of FIG. 5.

To further illustrate operation of the lane classification system 504, FIG. 6 depicts example images as processed at various points in the processing of FIG. 5. As shown in FIG. 6, the scene data 502 may correspond to multiple instances of lidar data 601, which are fed into the lane classification system 504. Each instance may correspond, for example, to a point cloud taken at a different location in an area.

The lane classification system 504 can thereafter aggregate the lidar data instances 601 at 602, into an aggregate lidar data set 603. The aggregate lidar data set 603 may, for example, provide higher resolution data than an individual lidar data instance 601. As noted above, in some embodiments the lane classification system 504 may operate on an individual lidar data instance 601, as opposed to an aggregate lidar data set 603.

Thereafter, the lane classification system 504, at 604, generates a pseudo-image 605. As noted above, the pseudo-image may reduce dimensionality of the aggregate lidar data 603, such as by representing a 3D point cloud as an annotated 2D image. Individual pixels of the pseudo-image are illustratively annotated with data corresponding to the voxels in the aggregate lidar data 603 to which they correspond, thus enabling representation of the 3D lidar data 603 in fewer dimensions.

The lane classification system 504 may then, at 606, pass the pseudo-image 605 through a machine learning model to classify individual pixels of the 2D image as corresponding to individual road elements. For example, the model may assign to individual pixels a probability that the pixel corresponds to a lane divider, a probability that the pixel corresponds to a road divider, and a probability that the pixel corresponds to a road boundary. As discussed in more detail below, the machine learning model may correspond to a CNN with a sub-network that generates a scene vector for input data from intermediary representations generated by the CNN, thus enabling the model to capture both global and local information within the input data and providing for more accurate classification of individual pixels as corresponding to particular road elements.

As a result of classification at 606, the lane classification system 504 may obtain information (e.g., metadata) indicating a probability that each pixel within the pseudo-image 605 corresponds to a given classification feature, such as a given type of road element. In one embodiment, the lane classification system 504 applies a threshold—which may be set during training according to an empirical review of results—to remove pixels that do not correspond to any classification feature. For example, the lane classification system 504 may remove from the pseudo-image 605 pixels with no classification above a threshold value (e.g., 30%, 50%, 70%, 90%, 95%, etc.). The lane classification system

504 may further assign each pixel a classification corresponding to the feature with a highest probability. For example, if a pixel is assigned a 50% probability of being a lane divider and a 60% probability of being a road divider, the lane classification system 504 may assign the pixel a classification as a road divider. As a result, the lane classification system 504 can generate a classification image 607, which includes pixels assigned to different classes according to the classification at 606. For example, in FIG. 6, the outermost line of image 607 can represent a detected road boundary, the 5$^{th}$ line from the left (shown in FIG. 6 in dotted line) can represent a detected road divider, and the remaining lines can represent detected lane dividers. Because the pseudo-image 605 is associated with highly accurate location information, the locations of these pixels can be translated into physical locations in an area corresponding to the pseudo-image 605 with high accuracy. Accordingly, an AV navigating the area can be informed with high confidence as to the physical location of each road element.

In some instances, it may be beneficial to further process a pixelized image, such as the classification image 607, to facilitate use by a computing device, such as those within an AV. For example, it may be helpful to convert pixel values, which may be difficult to individually map to physical locations or to use in calculations, into polylines. As used herein, polylines generally refer to a continuous line of one or more line segments, which may be represented for example as a set of vertices and edges between such vertices. As compared to pixel representations, polylines may be more efficiently stored (as many pixels may for example be represented by a single edge) and more readily used in calculations. Accordingly, in some embodiments the classification image 607 can be used to generate a set of polylines at 608. In general, conversion to polylines can include applying one or more morphological operations to the classification image 607, and converting a morphed image into polylines via a polyline conversion algorithm. In one embodiment, conversion to polylines occurs simultaneously for all types of classification (e.g., all types of road element), and the resulting polylines are then associated with a classification based on the classification of the pixels from which they were created. In another embodiment, conversion to polylines occurs independently for each type of classification, with the polylines created at each conversion being labeled as corresponding to the relevant classification for that conversion. Illustratively, conversion may occur by creating a binary image from the classification image 607, including only pixels with a relevant classification above a given threshold. Conversion can further include skeletonizing the binary image, such as by thinning all lines within the image to a given width (e.g., one pixel). In addition, conversion can include applying a polyline conversion algorithm to convert the pixels (e.g., of a skeletonized binary image) into a polyline. In one embodiment, the conversion algorithm includes treating each set of connected pixels in a skeletonized binary image as an undirected graph, and finding a longest path within the undirected graph without loops or branches. Thus, a set of connected pixels can be converted into vertices and edges corresponding to a polyline. This polyline, in turn, can be represented within a map of the area from which scene data was obtained, thus enabling programmatic detection of physical road elements.

Figure 7:
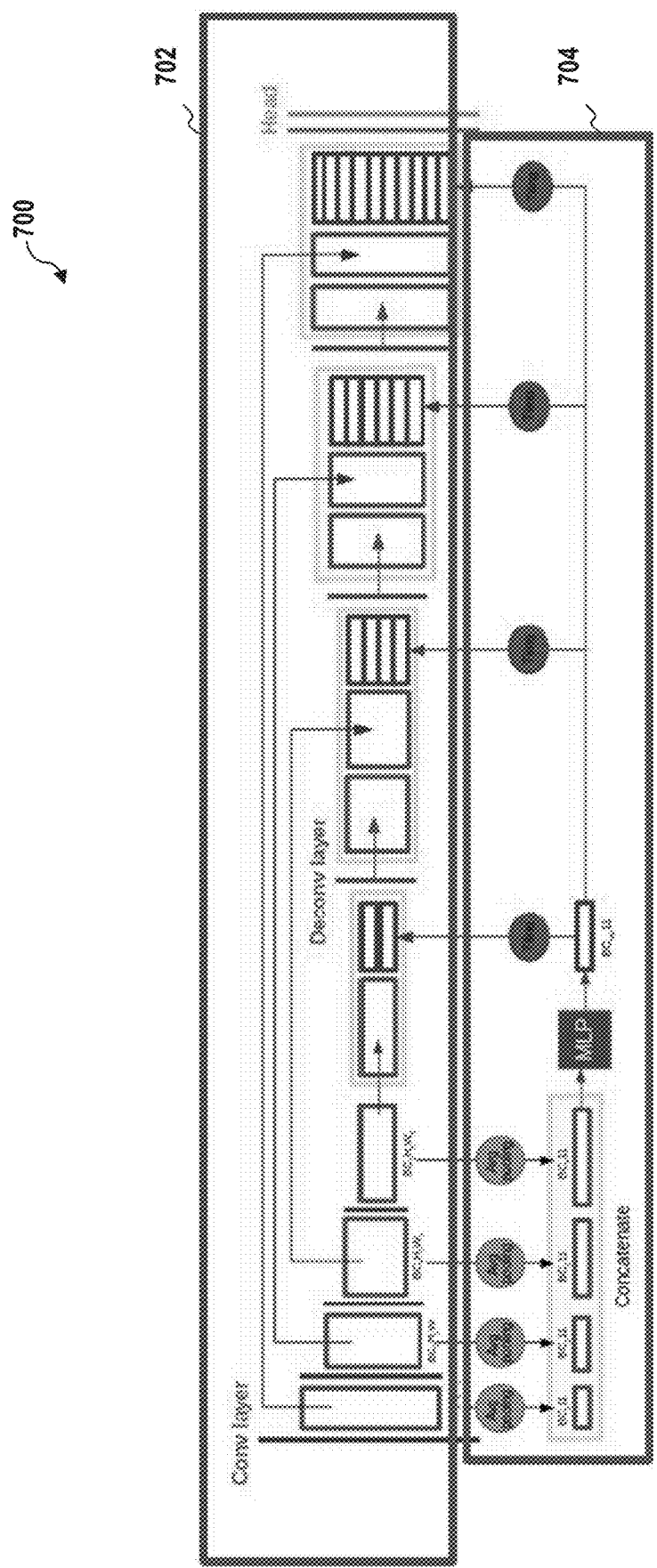
FIG. 7 is an illustrative machine learning architecture that can be implemented by the lane classification system of FIG. 5 to accurately detect road elements from lidar data.

With reference to FIG. 7, an illustrative machine learning architecture 700 will be described for detecting features within a 2D image using a CNN and global features sub-network. The architecture may be implemented by the lane classification system 504, for example as the road element classification system 508.

The architecture 700 includes both a CNN 702 portion and a sub-network 704 portion. The CNN 702 portion illustratively includes a series of convolution layers followed by a series of deconvolution layers. For example, the CNN 702 may be implemented as a U-net style network, where convolutional layers form a contracting path and deconvolutional layers form an expansive path. The convolutional layers may be implemented, for example, as described in conjunction with FIGS. 4C and 4D. The deconvolutional layers may generally operate opposite to convolutional layers, upsampling and upconverting smaller inputs into a larger intermediary output. In one embodiment, the convolutional and deconvolutional layers are symmetrical, such that a final deconvolutional layer provides an output or the same dimensions as the input. As shown in FIG. 7, each deconvolutional layer illustratively takes as input a set of features from a prior layer (e.g., the final convolutional layer or a prior deconvolutional layer) as well as the data of a corresponding convolutional layer (e.g., with the output of the first convolutional layer passed as input to a final deconvolutional layer, the output of the second convolutional layer passed as input to a penultimate deconvolutional layer, etc.). In one embodiment, the inputs to each deconvolutional layer are concatenated, such as by treating each input as one or more channels of a multi-channel input. An output of a final deconvolutional layer can then be provided to a regression head that classifies individual pixels of the output as corresponding to one or more road features. For example, the head may assign multiple classification values to each pixel, each classification value indicating a likelihood that the pixel corresponds to a given classification.

As shown in FIG. 7, in addition to an output of a prior layer and corresponding convolutional layer, each deconvolutional layer of the architecture 700 further takes as input an output of a sub-network 704. In FIG. 7, the output of the sub-network 704 is a scene feature vector, which provides global context regarding input to the architecture 700 (e.g., a pseudo-image representing a high accuracy liDAR scan of an area), facilitating contextual classification of features, such as distinction between road elements that may appear facially similar within the input. Specifically, in FIG. 7, the sub-network 704 includes a multi-layer perceptron, sometimes referred to as a fully connected feedforward neural network, that takes as input data corresponding to at least one intermediary representations generated by convolution layers of the CNN 702. The input data is illustratively of reduced dimensionality relative to the intermediary representation. For example, each 2D intermediary representation may be processed via a pooling operation, such as average pooling, to result in a vector. These vectors may be concatenated together to provide an input to the MLP. In FIG. 7, vectors are shown corresponding to each convolution layer of the CNN 702; however, in some embodiments the MLP may take as input vectors from less than all convolutional layers of the CNN 702. The output of the MLP is illustratively a scene feature vector. This output can then be provided as an input to one or more deconvolutional layers. To address dimensionality differences between the output of the MLP and the inputs to each deconvolutional layer, the sub-network 704 can tile the output of the MLP as appropriate for each deconvolutional layer, such as by repeating the output of the MLP for each input position to the deconvolutional layer. Because the output is generated based on intermediary representations of the convolutional layers, this output can provide global context regarding the input to the CNN 702. Accordingly, the output of the MLP in the sub-network 704 can enable the deconvolutional layers to account for global context of the input to the CNN 702. This, in turn, increases the accuracy of classifications produced by the architecture 700, enabling for example increased accuracy in classifying road elements within pseudo-images corresponding to liDAR scans of an environment around an AV.

The architecture 700 of FIG. 7 may be implemented both during training and inference. For example, training of the architecture 700 may occur on the basis of labeled pseudo-images, with individual pixels of the labeled images being marked as corresponding to a particular road feature. Thus, training may occur by passing labeled images through the architecture 700 and adjusting weights or operations within the architecture 700 such that a difference between an output of the architecture 700 and the labeled data is minimized. Thereafter, unlabeled pseudo-images may be passed through the trained architecture 700 (e.g., the architecture 700 with weights as established during training) to generate an output.

Figure 8:
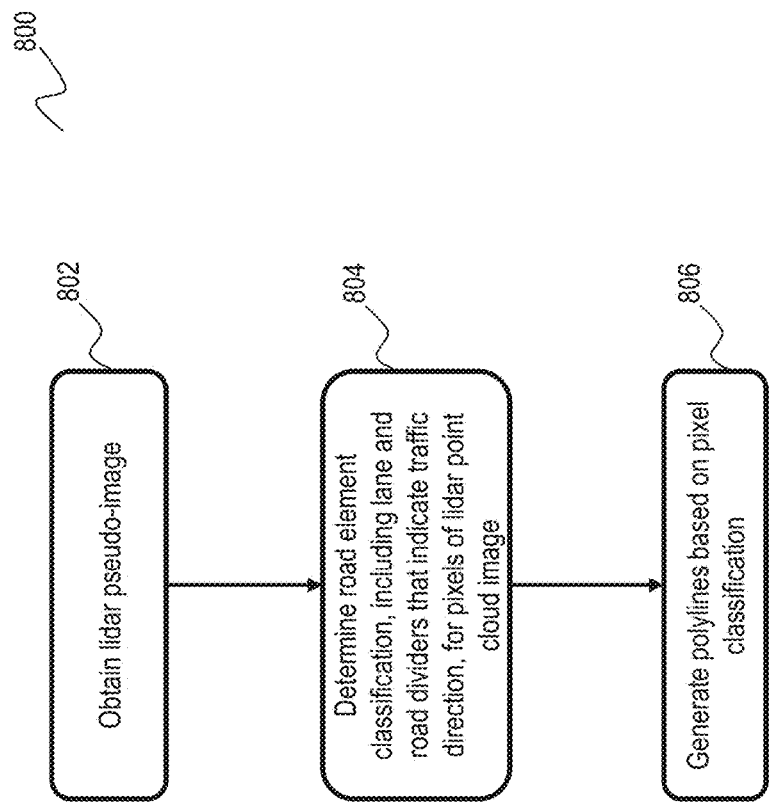
FIG. 8 is an illustrative routine for classifying road elements within lidar scan data.

With reference to FIG. 8, an illustrative routine 800 will be described for classifying road elements within liDAR scan data to provide high accuracy detection of road elements within a physical area. The routine 800 is illustratively implemented by the lane classification system 504 (e.g., as implemented on a device 300, potentially within a vehicle 200).

The routine 800 begins at block 802, where the lane classification system 504 obtains a pseudo-image of an area corresponding to one or more liDAR scans of the area. As discussed above, the pseudo-image may represent a 2D representation of the liDAR scans, such as by converting a height dimension into annotations of each pixel in the 2D representation. The pseudo-image may be generated based on data from a single liDAR scan, or based on an aggregate liDAR image representing data from multiple liDAR scans (e.g., with data of each adjusted to account for differences in position between scans).

The routine 800 then proceeds to block 804, where the lane classification system 504 determines road element classifications for pixels within the pseudo-image. As discussed above, road element classifications can correspond to any number of road elements, including for example lane dividers, road dividers, and road boundaries. In one embodiment, the lane classification system 504 utilizes the machine learning architecture 700 of FIG. 7, as previously trained on a set of training data (e.g., labeled pseudo-images), to generate classifications. As noted above, the architecture 700, by virtue of inclusion of a sub-network that accounts for global context via a scene feature vector, may be particularly suitable for distinguishing facially similar elements, such as lane and road dividers, that are otherwise difficult to distinguish within a pseudo-image. Accordingly, the classification determined at block 804 in one embodiment includes a classification of both lane and road dividers, thus enabling determination of traffic direction for lanes in the area.

At block 806, the lane classification system 504 generates polylines based on the pixel classifications resulting from implementation of block 804. Illustratively, generation of polylines can include binarization of the image, such as by removing (e.g., setting to a zero value) any pixels with a relevant classification not satisfying a threshold and equalizing (e.g., setting to a 1 value) all pixels with a relevant classification satisfying the threshold. Generation of polylines can further include morphological operations such as skeletonization of the image. Further, generation of polylines can include application of a polyline approximation algorithm to the image, such as by finding a longest non-looped path among adjacent positive pixels in the image and calculating a set of edges and vertices representing that path. Each polyline can then be associated with metadata indicating the classification of the pixels from which the polyline was created. In one embodiment, conversion to polylines occurs simultaneously for all types of classification (e.g., all types of road element). For example, each pixel may maintain metadata indicating the classification of the pixel, and one or more polylines can be generated for pixels of each classification, with the one or more polylines being labeled with the classification. In another embodiment, conversion to polylines occurs independently for each type of classification. For example, a binary image may be created for each classification (e.g., with pixels satisfying a threshold for the classification being set to a true or positive value, and all others being set to negative), and thereafter polylines can be created corresponding to the classification. The resulting polylines for each classification may then be combined to represent the relevant elements in the area.

As discussed above, because the pseudo-image can represent a high accuracy scan of a physical area, and because the lane classification system 504 provides for high accuracy classification of scanned elements, the generated polylines can thereafter be used as a high accuracy representation of road elements. For example, the classifications may be provided to one or more AVs to provide the AVs with high accuracy location information for road elements, thus enabling safe and effective programmatic navigation of the area by the AVs.

Figure 9:
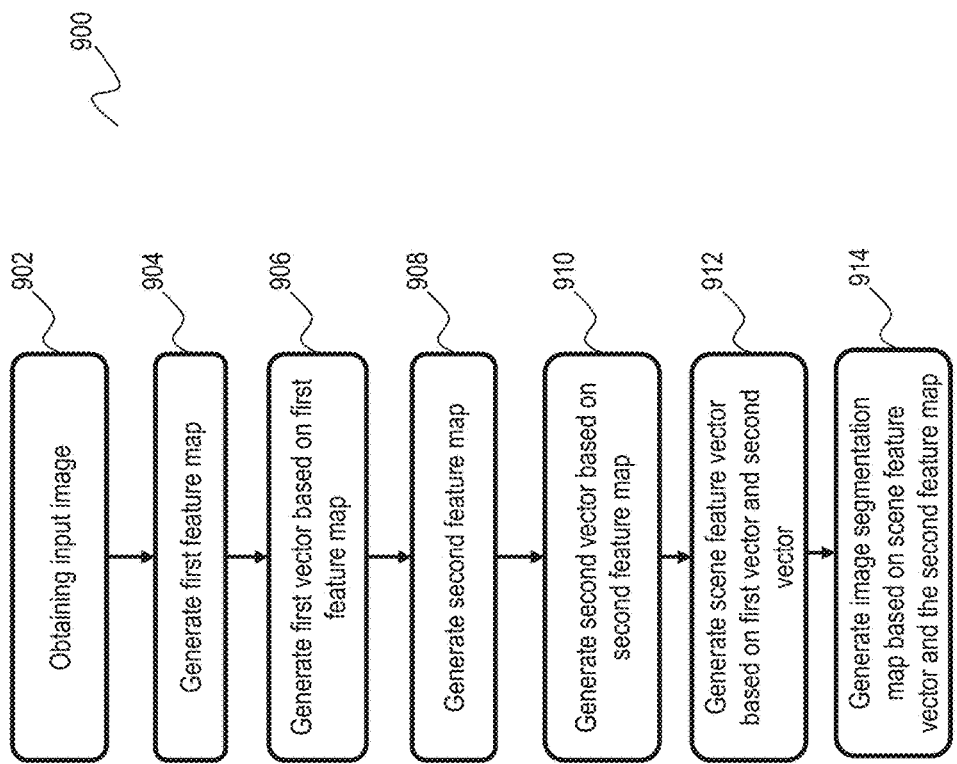
FIG. 9 is an illustrative routine for conducting image segmentation based on a convolutional neural network and global context sub-network, which may be used to conduct classification as discussed with respect to FIG. 8.

With reference to FIG. 9, an illustrative routine 900 will be described for conducting image segmentation based on a convolutional neural network and global context sub-network, which as noted above may be used to conduct classification as described with respect to FIG. 8. The routine 900 is illustratively implemented by the lane classification system 504 (e.g., as implemented on a device 300, potentially within a vehicle 200). For example, the routine 900 may be implemented as an implementation of the architecture 700 of FIG. 7, such as during inference, to detect and classify road elements reflected in data gathered during one or more liDAR scans.

The routine 900 begins at block 902, where the lane classification system 504 obtains an input 2D image. The image may for example be a pseudo-image generated based on data corresponding to one or more liDAR scans.

At block 904, the lane classification system 504 generates a first feature map from the input image. Illustratively, the first feature map may be generated by convolution of the input image during a convolutional layer, such as a layer described above with reference to the architecture of FIG. 7. The feature map may capture features of the input image, based for example on one or more kernels used to generate the first feature map, which may be a result of training of the architecture.

At block 906, the lane classification system 504 generates a first vector based on the first feature map. In general, the vector may be a transformation of the first feature map that reduces a dimensionality of the first feature map. For example, where the first feature map is a matrix of dimensionality x*y*c (where x and y represent coordinates in a 2D plane, and c represents channels for the pixel at those coordinates), the feature map may be of dimensionality c, thus compressing data from all coordinates into a single dimension. In one embodiment, the vector is generated by application of an average pooling operating to the elements of the first feature map. In other embodiments, other pooling operations (e.g., max pooling, min pooling, etc.) may be used. Accordingly, the feature map can be considered to capture global context from the feature map.

At block 908, the lane classification system 504 generates a second feature map for the input image. Illustratively, the second feature map may be generated by a second or subsequent convolutional layer of an architecture, such as the architecture 700 of FIG. 7. Accordingly, the second feature map may be generated by direct convolution of the first feature map, by convolution of an intermediary feature map generated by convolution from the first feature map, by multiple convolutions of such an intermediary feature map, etc. The second feature map can thus be considered to capture "higher level" features of the input image, as it results from more convolutions relative to the first feature map.

At block 910, the lane classification system 504 generates a second vector based on the second feature map. As noted above, a vector may be a transformation of a corresponding feature map that reduces a dimensionality of the feature map. In one embodiment, the second vector is generated by the same operation as the first vector, as applied to the second feature map. For example, both vectors may be generated by application of a given pooling operation to their respective maps. In another embodiment, the second vector is generated by a different operation, such as a different pooling operation, than the first vector. For example, the second vector may be generated by application of a max pooling operation to the second feature map, while the first vector may be generated by application of an average pooling operation to the first feature map. As with the first vector, because the second vector has a reduced dimensionality relative to the second feature map, the second vector can be considered to capture global context from the second feature map.

At block 912, the lane classification system 504 generates a scene feature vector based on the first and second vectors. For example, the lane classification system 504 may pass a concatenation of the first and second vectors through a multilayer perceptron that outputs the scene feature vector. The multilayer perceptron may be trained to extract, from the first and second vectors, relevant features to the classification task being performed. For example, the MLP may be trained to extract features within the first and second vectors relevant to classification of road elements (e.g., as road dividers, lane dividers, boundaries, etc.). As the vectors capture global context of each corresponding feature map, the scene feature vector can similarly be considered to capture global context across the vectors, and thus across convolutions of the input image.

While FIG. 9 depicts generation of a scene feature vector based on a first and second vector, in some embodiments the scene feature vector may be generated based on other vectors. For example, the lane classification system 504 may generate a feature vector for each convolutional layer, and generate the scene feature vector based on a concatenation of all such feature vectors. Thus, an architecture with n convolutional layers may generate a scene vector from passing through an MLP a concatenation of n feature vectors, each corresponding to the feature map generated by one of the convolutional layers.

At block 914, the lane classification system 504 generates an image segmentation map based on the scene feature vector and the second feature map. Illustratively, the second feature map may be output by a final convolutional layer within a machine learning architecture, and the lane classification system 504 may generate an image segmentation by deconvolving a combination (e.g., concatenation) of the second feature map and the scene feature vector. Because the scene feature vector illustratively has a dimensionality lower than the second feature map, the lane classification system 504 may tile the scene feature vector during deconvolution, such as by concatenating the scene feature vector to each pixel of the second feature map.

In some embodiments, the image segmentation map may be generated based on direct application of the scene feature vector to the second feature map, such as by deconvolving a concatenation of the second feature map and the scene feature vector. In other embodiments, the image segmentation map may be generated based on application of the scene feature vector to data generated from the second feature map. For example, the second feature map may be deconvolved one or more times, and the scene feature vector may be concatenated with a result of these deconvolution operations and passed through a final deconvolution operation to result in the image segmentation map. In yet another embodiment, an architecture may concatenate the scene feature vector to each given data set prior to convolution of the given data set. For example, the architecture may concatenate the scene feature map to the second feature map prior to an initial deconvolution, concatenate the scene feature map (e.g., with appropriate tiling) to the output of that deconvolution prior to a subsequent deconvolution, etc. A final result of deconvolutions is illustratively passed through a regression head to generate the image segmentation map. As discussed above, because the lane classification system 504 considers the scene feature vector as well as feature maps during generation of the image segmentation map, the accuracy of the segmentation map can be increased relative to other approaches.

While FIG. 9 depicts generation of an image segmentation map based on the scene feature vector and the second feature map, the lane classification system 504 can additionally or alternatively output other maps. For example, the lane classification system 504 may generate distance transform (DT) maps, such as inverse DT maps, that indicate a likelihood of each pixel corresponding to a road element as a relative distance of the pixel from the nearest instance of the road element. Illustratively, a distinct inverse DT map may be generated for each type of road element.

Various example embodiments of the disclosure can be described by the following clauses:

Clause 1. A computer-implemented method implemented by at least one processor, the computer-implemented method comprising:
  receiving, by the at least one processor, an image representing data from a liDAR scan of a vehicle environment;
  convoluting, by the at least one processor, the image to generate a first feature map;
  converting, by the at least one processor, the first feature map into a first feature vector;
  applying, by the at least one processor, one or more additional convolutions to the first feature map to generate a second feature map;
  converting, by the at least one processor, the second feature map into a second feature vector;
  passing, by the at least one processor, an input representing at least the first feature vector and the second feature vector through a neural network to produce a scene feature vector; and generating, by the at least one processor, an output map based on at least the scene feature vector and the second feature map, wherein the output map includes a plurality of pixels and indicates a likelihood of each pixel corresponding to a road element.

Clause 2. The computer-implemented method of clause 1, wherein the image is a two-dimensional pseudo-image generated from a three-dimensional liDAR point cloud image.

Clause 3. The computer-implemented method of clause 2, wherein the three-dimensional liDAR point cloud image is generated from an aggregate three-dimensional liDAR point cloud image representing multiple liDAR scans of the vehicle environment.

Clause 4. The computer-implemented method of any of clauses 1-3, wherein generating the output map comprises generating a segmentation map that associates a classification value to each pixel of the plurality of pixels, the classification value indicating the likelihood that the pixel corresponds to the road element.

Clause 5. The computer-implemented method of clause 4, wherein the road element is one of a plurality of road elements, and wherein the output map associates multiple classification values to each pixel, each of the multiple classification values corresponding to a respective road element of the plurality of road elements.

Clause 6. The computer-implemented method of clause 5, wherein the plurality of road elements comprises at least one of a lane divider indicating a division between lanes of traffic in the same direction, a road divider indicating a division between lanes of traffic in different directions, a road boundary element indicating a boundary of a roadway, stop lines, pedestrian markings, bike markings, and chevron markings.

Clause 7. The computer-implemented method of any of clauses 1-6, wherein applying one or more additional convolutions to the first feature map to generate the second feature map comprises applying a first additional convolution to the first feature map to generate an intermediary feature map and applying a second additional convolution to the intermediary feature map to generate the second feature map.

Clause 8. The computer-implemented method of any of clauses 1-7, wherein converting the first feature map into the first feature vector comprises reducing a dimensionality of the first feature map using a pooling operation.

Clause 9. The computer-implemented method clause 8, wherein the pooling operation is an average pooling operation that reduces the first feature map to a single dimension.

Clause 10. The computer-implemented method of any of clauses 1-9, wherein the input representing at least the first feature vector and the second feature vector is a concatenation of at least the first and second feature vectors.

Clause 11. The computer-implemented method of any of clauses 1-10, wherein the one or more additional convolutions further generate an additional feature map, and wherein the input representing at least the first feature vector and the second feature vector further represents the additional feature map.

Clause 12. The computer-implemented method of any of clauses 1-11, wherein generating the output map based on the scene feature vector and the second feature map includes deconvolving the second feature map based on at least the scene feature vector.

Clause 13. The computer-implemented method of clause 12, wherein deconvolving the second feature map is further based on the first feature map.

Clause 14. The computer-implemented method of clause 12, wherein deconvolving the second feature map based on at least the scene feature vector includes tiling the scene feature vector.

Clause 15. The computer-implemented method of clause 12, wherein generating the output map based on the scene feature vector and the second feature map further includes applying a regression head to a result of deconvolving the second feature map.

Clause 16. The computer-implemented method of any of clauses 1-14 further comprising generating one or more polylines from the output map, each of the one or more polylines identifying a road element in the vehicle environment.

Clause 17. The computer-implemented method of clause 16, wherein generating the one or more polylines comprises skeletonizing the output map.

Clause 18. The computer-implemented method of clause 16, wherein generating the one or more polylines comprises:
converting one or more adjacent pixels in the output map with a classification value satisfying a threshold into an undirected graph; and
identifying a longest path within the undirected graph as a polyline of the one or more polylines.

Clause 19. A system comprising:
one or more non-transitory data stores including computer-executable instructions; and
one or more hardware processors configured to execute the computer-executable instructions to:
receive an image representing data from a liDAR scan of a vehicle environment;
convolute the image to generate a first feature map;
convert the first feature map into a first feature vector;
apply one or more additional convolutions to the first feature map to generate a second feature map;
convert the second feature map into a second feature vector;
pass an input representing at least the first feature vector and the second feature vector through a neural network to produce a scene feature vector; and
generate an output map based on at least the scene feature vector and the second feature map, wherein the output map includes a plurality of pixels and indicates a likelihood of each pixel corresponding to a road element.

Clause 20. One or more non-transitory computer-readable media computer-executable instructions that, when executed by a computing system comprising a hardware processor, cause the computing system to:
receive an image representing data from a liDAR scan of a vehicle environment;
convolute the image to generate a first feature map;
convert the first feature map into a first feature vector;
apply one or more additional convolutions to the first feature map to generate a second feature map;
convert the second feature map into a second feature vector;

pass an input representing at least the first feature vector and the second feature vector through a neural network to produce a scene feature vector; and generate an output map based on at least the scene feature vector and the second feature map, wherein the output map includes a plurality of pixels and indicates a likelihood of each pixel corresponding to a road element.

Various additional example embodiments of the disclosure can be described by the following additional clauses:

Clause 1. A computer-implemented method comprising:
receiving, by at least one processor, data corresponding to an image representing a liDAR scan of a vehicle environment;
determining, by the at least one processor and using a machine learning model, a road element classification for a plurality of pixels of the image, wherein the classification for a particular pixel of the plurality of pixels indicates a traffic direction of a traffic lane associated with the particular pixel of the image; and
generating, by the at least one processor, a plurality of polylines based on the classification for the plurality of pixels, wherein at least two polylines of the plurality of polylines indicate a boundary between at least two traffic lanes for traffic traveling in different directions.

Clause 2. The computer-implemented method of clause 1, wherein receiving the data corresponding to the image comprises receiving data corresponding to a two-dimensional pseudo-image generated from a three-dimensional liDAR point cloud image.

Clause 3. The computer-implemented method of clause 2, wherein the two-dimensional pseudo-image includes per-pixel annotations reflecting a height dimension of the three-dimensional liDAR point cloud image.

Clause 4. The computer-implemented method of clause 2 or 3, wherein the three-dimensional liDAR point cloud image is generated from an aggregate three-dimensional liDAR point cloud image representing multiple liDAR scans of the vehicle environment.

Clause 5. The computer-implemented method of clause 4, wherein one or more of the multiple liDAR scans of the vehicle environment are adjusted based on movement of a liDAR sensor between the multiple liDAR scans.

Clause 6. The computer-implemented method of any one of the preceding clauses, wherein the at least one processor is included within an autonomous vehicle in the vehicle environment, and wherein the method is implemented by the autonomous vehicle.

Clause 7. The computer-implemented method of any one of the preceding clauses, wherein the liDAR scan is conducted by a liDAR sensor on a vehicle, and wherein the at least one processor is remote from the vehicle.

Clause 8. The computer-implemented method of any one of the preceding clauses, wherein determining the road element classification for the plurality of pixels of the image representing data from the lidar scan comprises generating an output map, the output map comprising a plurality of pixels and indicates a likelihood of each pixel corresponding to a road element of a plurality or road elements.

Clause 9. The computer-implemented method of clause 8, wherein the plurality of road elements includes at least one of a lane divider indicating a division between lanes of traffic in the same direction, a road divider indicating a division between lanes of traffic in different directions, a road boundary element indicating a boundary of a roadway, stop lines, pedestrian markings, bike markings, and chevron markings.

Clause 10. The computer-implemented method of any one of clauses 8 and 9, wherein generating the plurality of polylines comprises skeletonizing the output map.

Clause 11. The computer-implemented method of any one of clauses 8-10, wherein generating the plurality of polylines comprises:
converting one or more adjacent pixels in the output map with a classification value satisfying a threshold into an undirected graph; and
identifying a longest path within the undirected graph as a polyline of the one or more polylines.

Clause 12. A system comprising:
one or more non-transitory data store including computer-executable instructions; and
one or more processors configured to execute the computer-executable instructions to:
receive data corresponding to an image representing a liDAR scan of a vehicle environment;
determine a road element classification for a plurality of pixels of the image, wherein the classification for a particular pixel of the plurality of pixels indicates a traffic direction of a traffic lane associated with the particular pixel of the image; and
generate a plurality of polylines based on the classification for the plurality of pixels, wherein at least two polylines of the plurality of polylines indicate a boundary between at least two traffic lanes for traffic traveling in different directions.

Clause 13. The system of clause 12, wherein the data corresponding to the image comprises data corresponding to a two-dimensional pseudo-image generated from a three-dimensional liDAR point cloud image.

Clause 14. The system of clause 13, wherein the three-dimensional liDAR point cloud image is generated from an aggregate three-dimensional liDAR point cloud image representing multiple liDAR scans of the vehicle environment.

Clause 15. The system of any one of clauses 12-14, wherein the one or more processors are included within an autonomous vehicle in the vehicle environment.

Clause 16. The system of any one of clauses 12-15, wherein to determine the road element classification for the plurality of pixels of the image representing data from the lidar scan, the computer-executable instructions cause the system to generate an output map, the output map comprising a plurality of pixels and indicates a likelihood of each pixel corresponding to a road element of a plurality or road elements.

Clause 17. The system of clause 16, wherein to generate the plurality of polylines, the computer-executable instructions cause the computing system to:
convert one or more adjacent pixels in the output map with a classification value satisfying a threshold into an undirected graph; and
identify a longest path within the undirected graph as a polyline of the one or more polylines.

Clause 18. One or more non-transitory computer-readable media storing computer-executable instructions that, when executed by a computing system comprising a processor, cause the computing system to:
receive data corresponding to an image representing a liDAR scan of a vehicle environment;
determine a road element classification for a plurality of pixels of the image, wherein the classification for a particular pixel of the plurality of pixels indicates a traffic direction of a traffic lane associated with the particular pixel of the image; and generate a plurality of polylines based on the classification for the plurality of pixels, wherein at least two polylines of the plurality of polylines indicate a boundary between at least two traffic lanes for traffic traveling in different directions.

Clause 19. The one or more non-transitory computer-readable media of clause 18, wherein to determine the road element classification for the plurality of pixels of the image representing data from the lidar scan, the computer-executable instructions cause the system to generate an output map, the output map comprising a plurality of pixels and indicates a likelihood of each pixel corresponding to a road element of a plurality or road elements.

Clause 20. The one or more non-transitory computer-readable media of clause 19, wherein to generate the plurality of polylines, the computer-executable instructions cause the computing system to:

convert one or more adjacent pixels in the output map with a classification value satisfying a threshold into an undirected graph; and identify a longest path within the undirected graph as a polyline of the one or more polylines.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A computer-implemented method implemented by at least one processor, the computer-implemented method comprising:

receiving, by the at least one processor, an image representing data from a liDAR scan of a vehicle environment;

convoluting, by the at least one processor, the image to generate a first feature map;

converting, by the at least one processor, the first feature map into a first feature vector;

applying, by the at least one processor, one or more additional convolutions to the first feature map to generate a second feature map;

converting, by the at least one processor, the second feature map into a second feature vector;

passing, by the at least one processor, an input representing at least the first feature vector and the second feature vector through a neural network to produce a scene feature vector;

generating, by the at least one processor, an output map based on at least the scene feature vector and the second feature map, wherein the output map includes a plurality of pixels and indicates a likelihood of each pixel corresponding to a road element; and generating one or more polylines from the output map, each of the one or more polylines identifying a road element in the vehicle environment, wherein generating the one or more polylines comprises:

converting one or more adjacent pixels in the output map with a classification value satisfying a threshold into an undirected graph; and identifying a longest path within the undirected graph as a polyline of the one or more polylines.

2. The computer-implemented method of claim 1, wherein the image is a two-dimensional pseudo-image generated from a three-dimensional liDAR point cloud image.

3. The computer-implemented method of claim 2, wherein the three-dimensional liDAR point cloud image is generated from an aggregate three-dimensional liDAR point cloud image representing multiple liDAR scans of the vehicle environment.

4. The computer-implemented method of claim 1, wherein generating the output map comprises generating a segmentation map that associates a classification value to each pixel of the plurality of pixels, the classification value indicating the likelihood that the pixel corresponds to the road element.

5. The computer-implemented method of claim 4, wherein the road element is one of a plurality of road elements, and wherein the output map associates multiple classification values to each pixel, each of the multiple classification values corresponding to a respective road element of the plurality of road elements.

6. The computer-implemented method of claim 5, wherein the plurality of road elements comprises at least one of a lane divider indicating a division between lanes of traffic in a same direction, a road divider indicating a division between lanes of traffic in different directions, a road boundary element indicating a boundary of a roadway, stop lines, pedestrian markings, bike markings, and chevron markings.

7. The computer-implemented method of claim 1, wherein applying one or more additional convolutions to the first feature map to generate the second feature map comprises applying a first additional convolution to the first feature map to generate an intermediary feature map and applying a second additional convolution to the intermediary feature map to generate the second feature map.

8. The computer-implemented method of claim 1, wherein converting the first feature map into the first feature vector comprises reducing a dimensionality of the first feature map using a pooling operation.

9. The computer-implemented method of claim 1, wherein the input representing at least the first feature vector and the second feature vector is a concatenation of at least the first feature vector and the second feature vectors.

10. The computer-implemented method of claim 1, wherein generating the output map based on the scene feature vector and the second feature map includes deconvolving the second feature map based on at least the scene feature vector.

11. The computer-implemented method of claim 1, further comprising generating one or more polylines from the output map, each of the one or more polylines identifying a road element in the vehicle environment.

12. A system comprising:

one or more non-transitory data stores including computer-executable instructions; and one or more hardware processors configured to execute the computer-executable instructions to:

receive an image representing data from a liDAR scan of a vehicle environment;

convolute the image to generate a first feature map;
convert the first feature map into a first feature vector;
apply one or more additional convolutions to the first feature map to generate a second feature map;
convert the second feature map into a second feature vector;
pass an input representing at least the first feature vector and the second feature vector through a neural network to produce a scene feature vector; and
generate an output map based on at least the scene feature vector and the second feature map, wherein the output map includes a plurality of pixels and indicates a likelihood of each pixel corresponding to a road element; and
generate one or more polylines from the output map, each of the one or more polylines identifying a road element in the vehicle environment, wherein to generate the one or more polylines, the computer-executable instructions cause the system to:
  convert one or more adjacent pixels in the output map with a classification value satisfying a threshold into an undirected graph; and
  identify a longest path within the undirected graph as a polyline of the one or more polylines.

13. The system of claim 12, wherein to generate the one or more polylines, the computer-executable instructions, when executed by the one or more hardware processors, further cause the system to skeletonize the output map.

* * * * *

UNITED STATES PATENT AND TRADEMARK OFFICE
CERTIFICATE OF CORRECTION

PATENT NO. : 12,450,918 B2  
APPLICATION NO. : 17/823916  
DATED : October 21, 2025  
INVENTOR(S) : Dhananjai Sharma Page 1 of 1

It is certified that error appears in the above-identified patent and that said Letters Patent is hereby corrected as shown below:

In the Specification

Column 6, Line 14, delete "Infrastructure (V2X) device)" and insert -- Infrastructure (V2I) device) --.

Column 12, Line 14, delete "a WiFi® interface," and insert -- a Wi-Fi® interface, --.

In the Claims

Column 34, Claim 9, Line 51, delete "feature vectors." and insert -- feature vector. --.

Column 35, Claim 12, Line 9, delete "feature vector; and" and insert -- feature vector; --.

Signed and Sealed this  
Thirteenth Day of January, 2026

John A. Squires  
*Director of the United States Patent and Trademark Office*